US008018818B2

United States Patent
Lantz et al.

(10) Patent No.: US 8,018,818 B2
(45) Date of Patent: Sep. 13, 2011

(54) SYSTEMS AND METHODS FOR STORING AND READING DATA IN A DATA STORAGE SYSTEM

(75) Inventors: Mark Alfred Lantz, Adliswil (CH); Bernd W Gotsmann, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 1371 days.

(21) Appl. No.: 11/393,559

(22) Filed: Mar. 30, 2006

(65) Prior Publication Data

US 2007/0242594 A1   Oct. 18, 2007

(51) Int. Cl.
  *G11B 7/00*   (2006.01)
(52) U.S. Cl. .................................. 369/126; 369/127
(58) Field of Classification Search .................. 369/126, 369/127; 365/185.01, 185.03, 185.26
  See application file for complete search history.

(56) References Cited

U.S. PATENT DOCUMENTS

| 6,477,132 | B1 | 11/2002 | Azuma et al. |
| 6,515,957 | B1 | 2/2003 | Newns et al. |
| 7,335,942 | B2 * | 2/2008 | Edinger et al. ............. 257/328 |
| 7,542,402 | B2 * | 6/2009 | Mejia et al. .................. 369/126 |
| 2005/0135203 | A1 * | 6/2005 | Mejia ....................... 369/13.56 |
| 2005/0147017 | A1 * | 7/2005 | Gibson ....................... 369/126 |

OTHER PUBLICATIONS

*The resonant gate transistor*, IEEE TED-14, No. 3, 1967.

* cited by examiner

*Primary Examiner* — Wayne Young
*Assistant Examiner* — Latanya Bibbins
(74) *Attorney, Agent, or Firm* — Daniel P. Morris; Stephen C. Kaufman; Daryl K. Neff

(57) ABSTRACT

Systems and methods for storing and reading data in a data storage system are provided. The data storage system includes a storage medium for storing data. The storage medium stores data as a plurality of topographical features. Further, the data storage system includes one or more transducer. One or more transducer writes data on the storage medium. Additionally, the data storage medium includes one or more gates. A first voltage bias is applied to one or more gates. The data storage system further includes, one or more read heads. One or more read heads include one or more Floating Gate Transistors (FGTs). The first voltage bias creates an electric field between one or more FGTs and one or more gates. A change in the electric field is detected by one or more FGTs.

10 Claims, 9 Drawing Sheets

SYSTEMS AND METHODS FOR STORING AND READING DATA IN A DATA STORAGE SYSTEM

FIELD OF THE INVENTION

The present invention generally relates to data storage systems. More specifically, the invention relates to storing and reading data in a data storage system.

BACKGROUND OF THE INVENTION

In data storage systems, data is stored on a storage medium. The storage medium may be a polymer film. In various embodiments of the invention, the storage medium may be one of a magnetic film, a ferro-electric film, and a phase-change film. In thermo-mechanical data storage, data is stored in the form of a plurality of topographical features on the storage medium. The data is written on the storage medium by using a transducer integrated in a tip of a cantilever structure. The transducer includes a heating element that creates the plurality of topographical features to store data. Data stored on the storage medium is read by scanning the storage medium with the tip of the cantilever structure. The tip co-operates with the plurality of topographical features to read the data.

In data storage systems that read data by sensing the topographic state of a surface, the temperature dependence properties of silicon are used to sense changes in separation of cantilever structure and substrate. A read-heater is integrated in a cantilever structure. While scanning the storage medium for reading the data, if the tip of the cantilever structure moves into a topographical feature, the read head integrated in the cantilever structure moves closer to the substrate. As a result of this, the efficiency of cooling of the read-heater increases. The increase in efficiency of cooling results in a decrease in temperature. The decrease in temperature is sensed as change in resistance of the read-heater. The change in resistance of the read-heater is represented as data.

U.S. Pat. No. 6,515,957, titled "Ferroelectric drive for data storage" assigned to International Business Machines Corporation, Armonk, N.Y., discloses a data storage system that preferably comprises an electrically conducting rotatable hard disk substrate having a ferroelectric storage layer that comprises storage cells which can be written and read along concentric recording tracks, a pivoted servo arm with a free end for movement across the recording tracks. The free end of the servo arm includes both a write head, including an electrically conducting tip, and a read head, including a field effect transistor (FET), held close to the disk surface. The FET has a gate electrode and is positioned on the servo arm with the gate electrode held close to the ferroelectric surface of the disk during read operations of the data storage system. Read and write operations can be performed with standard semiconductor technologies in combination with existing magnetic hard-disk servo-control architecture.

Additionally, U.S. Pat. No. 6,477,132, titled, "Probe and information recording/reproduction apparatus using the same" assigned to Canon Kabushiki Kaisha, Tokyo, JP, discloses a probe including a cantilever having a movable end and formed from an elastic body, an electroconductive sensing needle arranged at the movable end of the cantilever, and a FET arranged at the movable end of the cantilever and having a gate electrode electronically connected to the electroconductive sensing needle. The probe may further comprise another FET formed on the cantilever and having its drain electrically connected to the sensing needle. The probe may be used in an information recording/reproduction apparatus.

However, each of these prior art suffers from one or more of the following limitations. Speed of read-back is limited by heat capacity of the read-heater and heat sinking of the read-heater. Additionally, minimum volume of a read-heater is limited due to noise considerations. The cantilever structures are mechanically weak and have a limited mechanical speed because they require thermal isolation. Further, the signal to carrier ratio is small, which complicates the design of detection electronics. The tip of cantilever structure is used for electric writing and not for creating or moving into/over a topographical feature. Further, the tip is not used to sense distance between the cantilever structure and the substrate.

SUMMARY OF THE INVENTION

An object of the invention is to provide a system and a method for reading data from a storage medium by applying a first voltage bias to a gate in a data storage system.

Another object of the invention is to provide a system and a method in which the speed of data storage system is considerably high.

Yet another object of the invention is to provide a system and a method in which a large signal to carrier ratio can be achieved.

Another object of the invention is to provide a system and a method that does not rely on air for transduction of displacement/distance information.

The above objectives are achieved by providing systems and methods for storing and reading data in a data storage system. The data storage system includes a storage medium for storing data. The storage medium stores data as a plurality of topographical features. Further, the data storage system includes one or more transducer. One or more transducer writes data on the storage medium. Additionally, the data storage medium includes one or more gates. A first voltage bias is applied to one or more gates. The data storage system further includes, one or more read heads. One or more read heads include one or more Floating Gate Transistors (FGTs). The first voltage bias creates an electric field between one or more FGTs and one or more gates. A change in the electric field is detected by one or more FGTs.

BRIEF DESCRIPTION OF THE DRAWINGS

The foregoing objects and advantages of the present invention for a system and method for storing and reading data in a data storage system may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION

Figure 1:
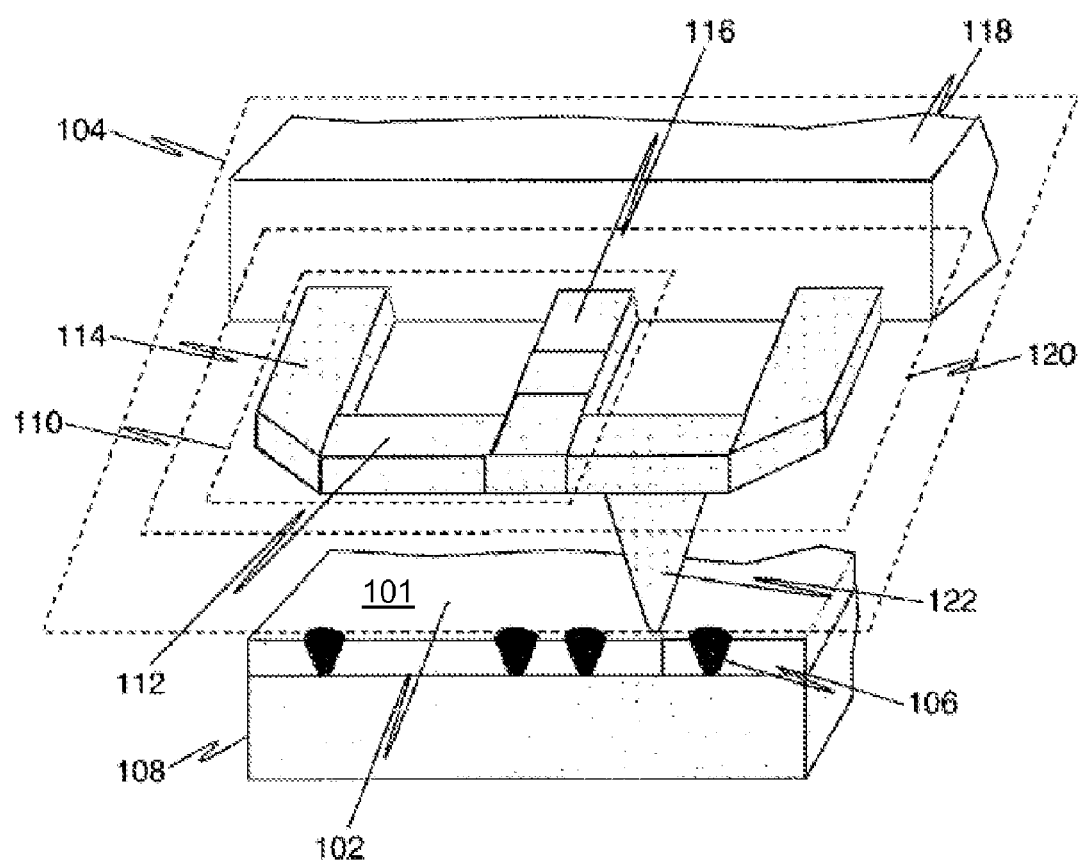
FIG. 1 shows a data storage system, in accordance with an embodiment of the invention.

Before describing in detail embodiments that are in accordance with the present invention, it should be observed that the embodiments reside primarily in combinations of method steps and system components related to a system and method for storing and reading data in a data storage system. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises ... a", "has ... a", "includes ... a", "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various embodiments of the invention provide methods and systems for storing and reading data in a data storage system. The data storage system includes a storage medium for storing data. Data is stored in the form a plurality of topographical features on the storage medium. The data is written on the storage medium by using a transducer integrated in a tip of a cantilever structure. The transducer includes a heating element that creates the plurality of topographical features to store data. Data stored on the storage medium is read by scanning the storage medium with the tip. The tip co-operates with the plurality of topographical features to read the data.

FIG. 1 shows a data storage system 100, in accordance with an embodiment of the invention. Data storage system 100 includes a storage medium 102, one or more transducers (not shown in FIG. 1), one or more gates (not shown in FIG. 1), and one or more read heads (for example, read head 104). In an embodiment of the invention, each read head is a read-write head. Storage medium 102 is used for storing data. Data is stored on storage medium 102 as a plurality of topographical features (for example, a topographical feature 106). Examples of the topographical features may include, but are not limited to, bumps extending in a first direction upwardly relative to a first surface 101 of the storage medium, and indentations or trenches extending in a first direction downwardly relative to a first surface 101 of the storage medium. In an embodiment of the invention, storage medium 102 can be a polymer film that stores data. Storage medium 102 is deposited on a substrate 108.

One or more read heads are used to write data on storage medium 102. Each read head includes one or more transducers. Each transducer writes data on storage medium 102 by creating the plurality of topographical features. In an embodiment of the invention, each transducer includes a heating element that creates the plurality of topographical features on storage medium 102.

Further, one or more read heads are used to read data stored on storage medium 102. Each read head includes one or more Floating Gate Transistors (FGTs) (for example, an FGT 110). Each FGT includes a channel 112, a source 114 and a drain 116. In an exemplary embodiment, the channel 112 is made up of low-doped p silicon and each of source 114 and drain 116 are made up of high-doped n silicon. In another exemplary embodiment, channel 112 is made up of high-doped n silicon and each of source 114 and drain 116 are made up of low-doped p silicon. In an embodiment of the invention, channel 112 may have a gate-dielectric attached to it. The gate-dielectric passivates storage medium 102 and enhances electric field. Gate-dielectric may be made up of silicon dioxide. In the particular embodiment shown in FIG. 1, the drain and the channel separate the source from the tip.

Further, a first voltage bias is applied to one or more gates to read data from storage medium 102. The first voltage bias creates an electric field between one or more gates and one or more FGTs. The electric field changes if the distance of a gate relative to an FGT is modified. The change in the electric field is detected using channel 112, as a result of which, the flow of current in one or more FGTs is modified. A second voltage bias is applied between source 114 and drain 116 to modify the flow of current in one or more FGTs.

Further, the modification in the flow of current is represented as data by using circuitry and electric connection (not shown in FIG. 1) fabricated inside a supporting structure 118. Supporting structure 118 is mechanically fixed to each read head of data storage system 100. For example, a first voltage bias is applied to a gate. The first voltage bias creates an electric field between FGT 110 and the gate. If the distance of gate relative to FGT 110 is modified, then the electric field between FGT 110 and the gate varies. The variation in the electric field is detected by FGT 110, as a result of which, the flow of current in FGT 110 is modified. Thereafter, the modification in the flow of current is represented as data.

In an embodiment of the invention, each read head includes one or more cantilever structures (for example, a cantilever structure 120). Each cantilever structure includes a tip (for example, a tip 122). Tip 122 co-operates with the plurality of topographical features to read data stored on storage medium 102. Further, if a tip of each cantilever structure moves into or over a topographical feature, then the distance of each cantilever structure relative to storage medium 102 changes. For example, if tip 122 moves in a first direction downwardly relative to the first surface into topographical feature 106, which is an indentation/trench, then the distance of cantilever structure 120 relative to storage medium 102 decreases. Further, if tip 122 moves in a first direction upwardly relative to the first surface over topographical feature 106, which is a bump, then the distance of cantilever structure 120 relative to storage medium 102 increases. Additionally, each cantilever structure is connected to supporting structure 118 of data storage system 100. As seen in FIG. 1, the tip 122 can be displaced in a direction along the first surface 101 of the medium from each of the source, the drain, and the channel of the FGT 110. As further seen in FIG. 1, the direction in which the tip is displaced from the source, drain and channel of the FGT is transverse to the downwardly or upwardly directions in which the tip may move into or over a topographical feature of the storage medium.

Further, in an embodiment of the invention, the electric field between a gate and an FGT increases if a tip of each cantilever structure moves into a topographical feature, which is an indentation/trench. This is explained further in detail in conjunction with FIG. 3. Additionally, the electric field between a gate and an FGT decreases if a tip of each cantilever structure moves over a topographical feature, which is a bump. This is explained further in detail in conjunction with FIG. 3. In another embodiment of the invention, electric field between a gate and an FGT decreases if a tip of each cantilever structure moves into a topographical feature, which is an indentation/trench. This is explained in conjunction with FIG. 6 and FIG. 9. Also, electric field between a gate and an FGT increases if a tip of each cantilever structure moves into a topographical feature, which is a bump. This is explained in detail in conjunction with FIG. 5 and FIG. 8.

In an exemplary embodiment, one or more FGTs are integrated in each cantilever structure. For example, FGT 110 is integrated in cantilever structure 120. Further, substrate 108 performs as a gate. Therefore, the first voltage bias is applied to substrate 108 to create an electric field between each FGT and substrate 108. This is explained in detail in conjunction with FIG. 2 and FIG. 3.

In another exemplary embodiment, one or more FGTs are integrated in each cantilever structure. Further, one or more gates are integrated in supporting structure 118 of data storage system 100. This is explained in detail in conjunction with FIG. 4, FIG. 5 and FIG. 6.

In another exemplary embodiment, one or more gates are integrated in each cantilever structure and one or more FGTs are integrated in the supporting structure of data storage system 100. This is explained in detail in conjunction with FIG. 8 and FIG. 9.

Figure 2:
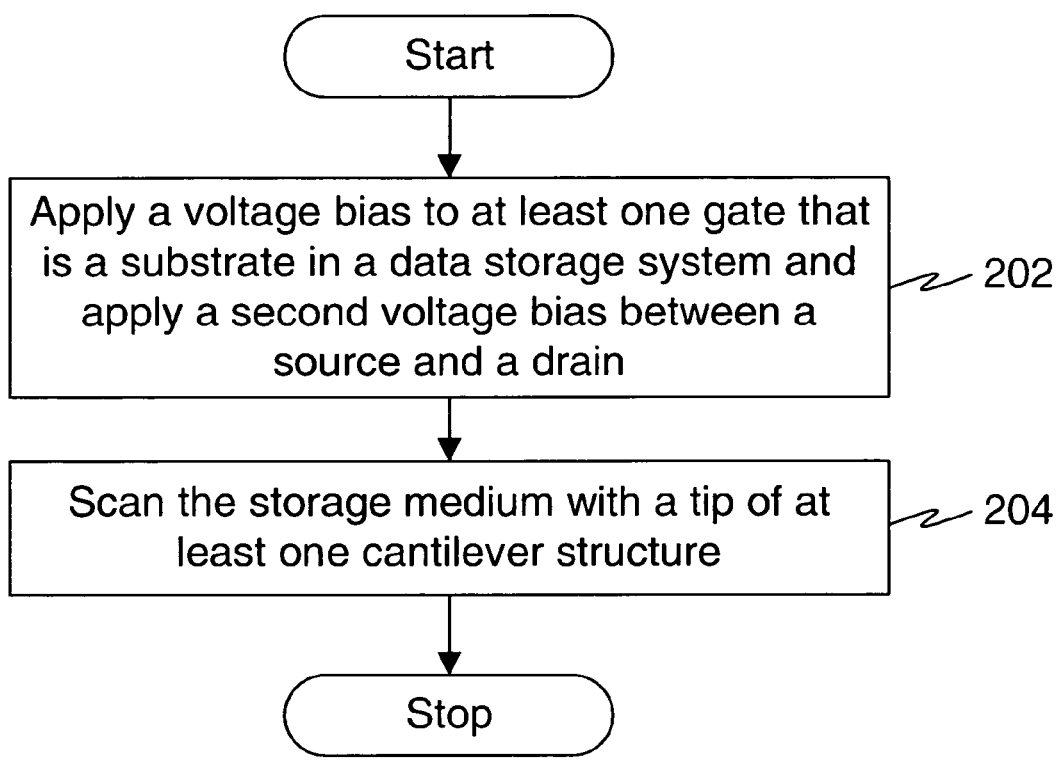
FIG. 2 is a flowchart of a method for reading data from a storage medium in a data storage system, in accordance with an embodiment of the invention.

FIG. 2 is a flowchart of a method for reading data from storage medium 102 in data storage system 100, in accordance with an embodiment of the invention. At step 202, a first voltage bias is applied to one or more gates in data storage system 100. Further, a second voltage bias is applied between source 114 and drain 116 to modify the flow of current in one or more FGTs. The first voltage bias creates an electric field between one or more gates and one or more FGTs. In this embodiment, substrate 108 acts as one or more gates. Therefore, first voltage bias is applied to substrate 108. The first voltage bias creates an electric field between one or more FGTs and substrate 108. For example, applying the first voltage bias creates an electric field between substrate 108 and FGT 110. This is further explained in detail in conjunction with FIG. 3. Further, storage medium 102 is deposited on substrate 108.

Thereafter, at step 204, storage medium 102 is scanned with tip 122 of one or more cantilever structures. Each cantilever structure integrates one or more FGTs. For example, cantilever structure 120 integrates FGT 110. Further, storage medium 102 is scanned by moving tip 122 of one or more cantilever structures relative to storage medium 102. Tip 122 co-operates with a plurality of topographical features on storage medium 102 to read data. Data is stored as the plurality of topographical features on storage medium 102.

Further, while scanning storage medium 102, as tip 122 moves into or over a topographical feature on storage medium 102, the electric field between one or more gates and one or more FGTs varies. This is explained in conjunction with FIG. 3.

The variation in the electric field between one or more gates and one or more FGTs is detected by one or more FGTs. The variation of the electric field modifies the flow of current in one or more FGTs. For example, variation in the electric field between substrate 108 and FGT 110 is detected using channel 112 of FGT 110. The second voltage bias is applied between source 114 and drain 116 to modify the flow of current in one or more FGTs.

Further, the modification in the flow of current in one or more FGTs is represented as data by circuitry and electrical connection fabricated in supporting structure 118. This has been explained in detail in conjunction with FIG. 1.

Figure 3:
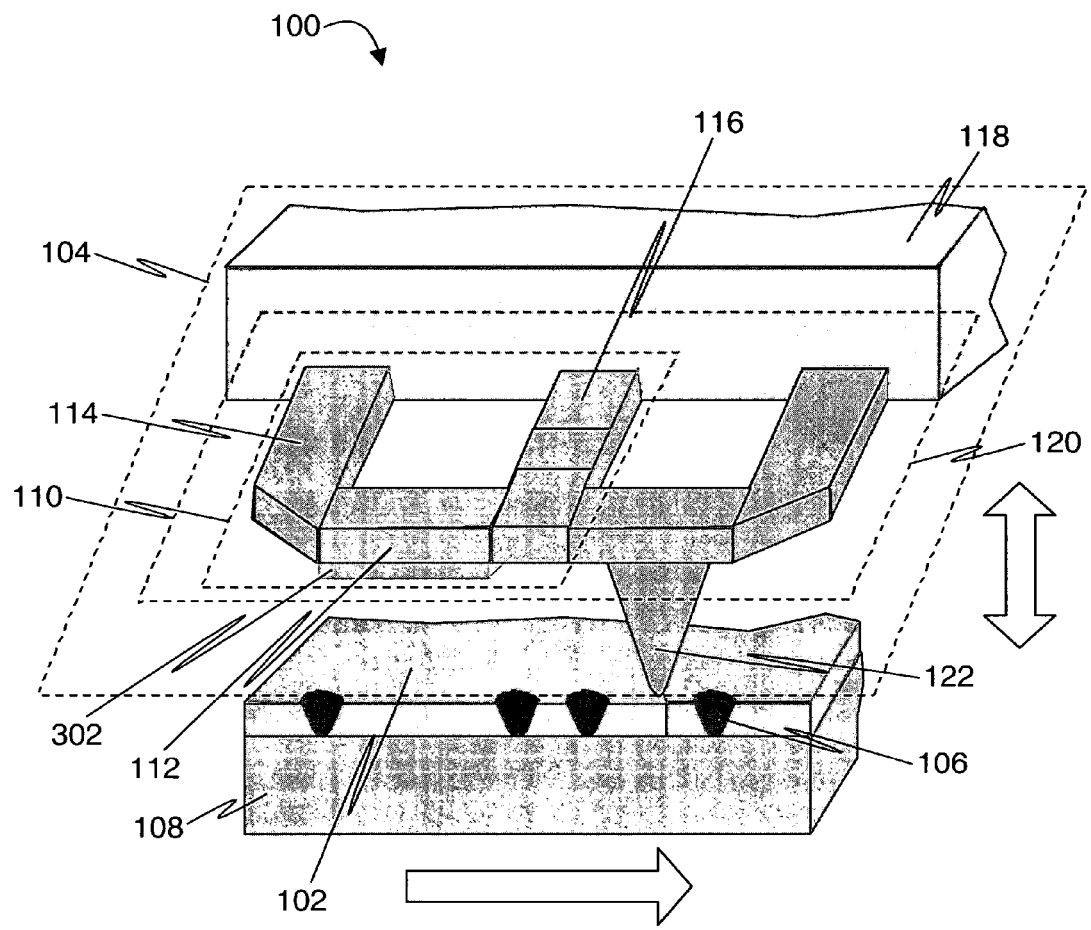
FIG. 3 shows a data storage system, in accordance with an exemplary embodiment of the invention.

FIG. 3 shows data storage system 100, in accordance with an exemplary embodiment of the invention. In this exemplary embodiment, FGT 110 is integrated in cantilever structure 120 of data storage system 100. It will be obvious to a person skilled in the art that more than one FGT can be integrated in cantilever structure 120. Further, substrate 108 is one or more gates. Therefore, a first voltage bias is applied to substrate 108. The first voltage bias creates an electric field between substrate 108 and FGT 110.

Data is read by moving substrate 108 with respect to read head 104. While moving substrate 108 relative to read head 104, as tip 122 moves into topographical feature 106, the distance of cantilever structure 120 relative to substrate 108 changes. Therefore, the distance of FGT 110 relative to substrate 108 is changed. As a result of this, the electric field between FGT 110 and substrate 108 varies. For example, if tip 122 moves into topographical feature 106, which is an indentation, then the distance of cantilever structure 120 relative to substrate 108 decreases. Therefore, the distance of FGT 110 relative to substrate 108 decreases. As a result of this, the electric field between FGT 110 and substrate 108 increases. Similarly, if tip 122 moves over topographical feature 106, which is a bump, then the distance of cantilever structure 120 relative to substrate 108 increases. Therefore, the distance of FGT 110 relative to substrate 108 increases. As a result of this, the electric field between FGT 110 and substrate 108 decreases.

Further, the variation in electric field is detected using channel 112 of FGT 110. The variation in the electric field modifies the flow of current in FGT 110. The modification in the flow of current is represented as data by using circuitry and electrical connection (not shown in the FIG. 3) inside supporting structure 118. Additionally, channel 112 has a gate-dielectric 302 attached to it. Gate-dielectric 302 is placed parallel to substrate 108 between FGT 110 and substrate 108.

Figure 4:
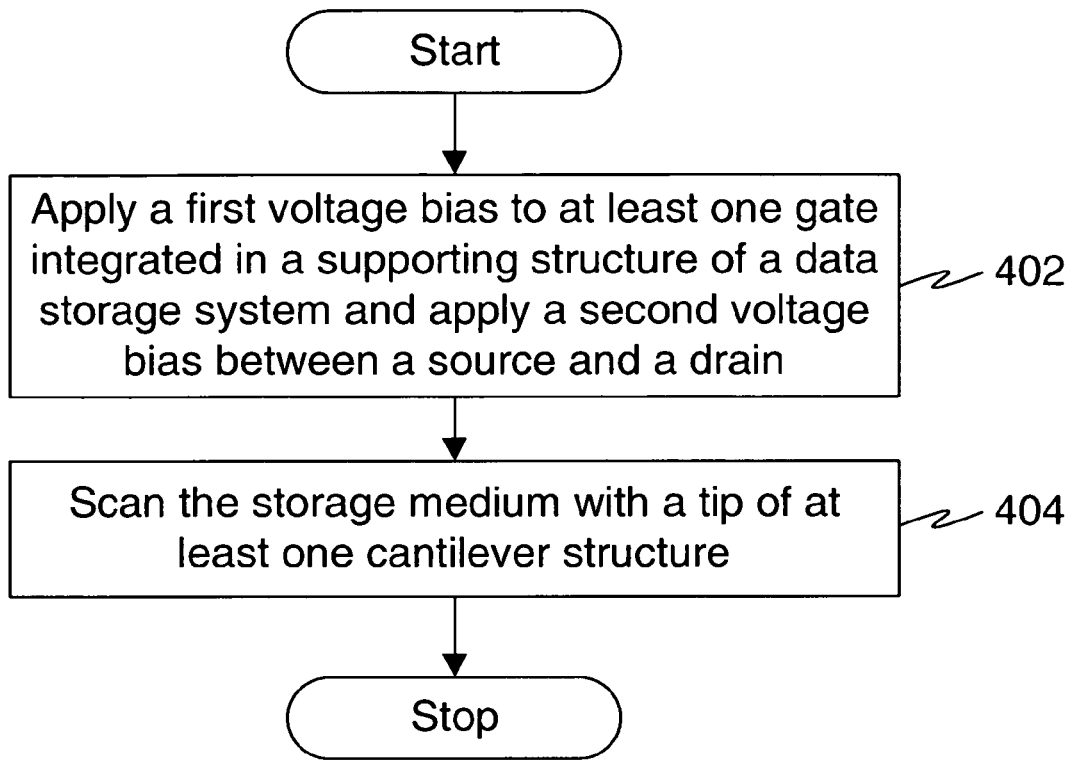
FIG. 4 is a flowchart of a method for reading data from a storage medium in a data storage system, in accordance with another embodiment of the invention.

FIG. 4 is a flowchart of a method for reading data from storage medium 102 in data storage system 100, in accordance with another embodiment of the invention. At step 402, a first voltage bias is applied to one or more gates in data storage system 100. Further, a second voltage bias is applied between source 114 and drain 116 to modify the flow of current in one or more FGTs. The first voltage bias creates an electric field between one or more gates and one or more FGTs. For example, the first voltage bias creates an electric field between a gate and FGT 110. Each gate is integrated in supporting structure 118 of data storage system 100. This is further explained in detail in conjunction with FIG. 5 and FIG. 6.

Thereafter, at step 404, storage medium 102 is scanned with tip 122 of one or more cantilever structures. Each cantilever structure integrates one or more FGTs. For example, cantilever structure 120 integrates FGT 110. Further, storage medium 102 is scanned by moving tip 122 of one or more cantilever structures relative to storage medium 102. Tip 122 co-operates with a plurality of topographical features on storage medium 102 to read data. Data is stored as the plurality of topographical features. The second voltage bias is applied between source 114 and drain 116 to modify the flow of current in one or more FGTs.

While scanning the storage medium 102 as tip 122 moves into or over a topographical feature on storage medium 102, the electric field between one or more gates and one or more FGTs varies. This is further explained in detail in conjunction with FIG. 5 and FIG. 6.

Additionally, in an exemplary embodiment of the invention, as tip 122 moves into or over a topographical feature, each FGT moves in a direction parallel to the electric field. This is further explained in conjunction with FIG. 5. In another exemplary embodiment of the invention, as tip 122 moves into or over a topographical feature, each FGT moves in a direction perpendicular to the electric field. This is further explained in detail in conjunction with FIG. 6.

Figure 5:
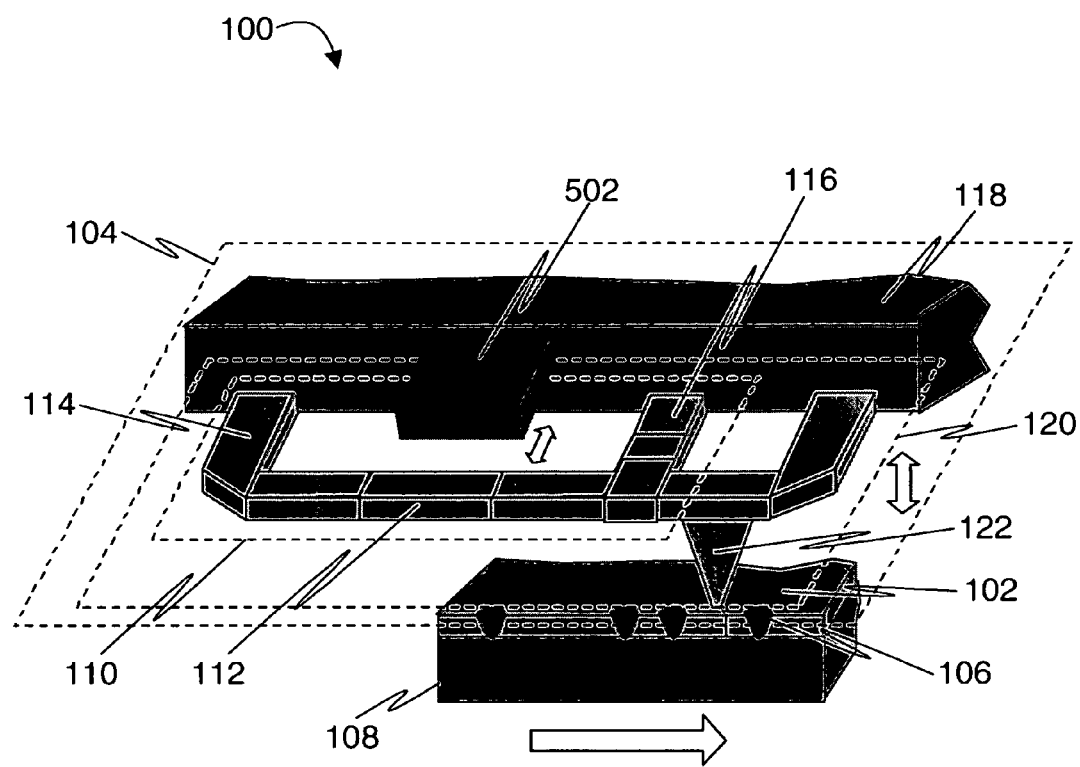
FIG. 5 shows a data storage system, in accordance with another exemplary embodiment of the invention.

FIG. 5 shows data storage system 100, in accordance with another exemplary embodiment of the invention. In this exemplary embodiment of the invention, FGT 110 is integrated in cantilever structure 120. It will be obvious to a person skilled in the art that more than one FGT can be integrated in cantilever structure 120. Further, a gate 502 is integrated in supporting structure 118. It will be obvious to a person skilled in the art that more than one gate can be integrated in supporting structure 118. A first voltage bias is applied to gate 502. The first voltage bias creates an electric field between gate 502 and FGT 110. Further, gate 502 is integrated in supporting structure 118, such that, FGT 110 moves in a direction parallel to the electric field created between gate 502 and FGT 110.

Further, FGT 110 moves if tip 122 moves into or over topographical feature 106, while reading data from storage medium 102. Data is read by moving substrate 108 relative to read head 104. While moving substrate 108 relative to read head 104, as tip 122 moves into or over topographical feature 106, the distance of cantilever structure 120 relative to gate 502 changes. Therefore, the distance of FGT 110 with respect to gate 502 gets changed. Further, as a result of the change in the distance, the electric field between FGT 110 and gate 502 varies. For example, if tip 122 moves into topographical feature 106, which is an indentation, then the distance of cantilever structure 120 relative to gate 502 increases. Therefore, the distance of FGT 110 with respect to gate 502 increases. Further, as a result of increase in the distance, the electric field between FGT 110 and gate 502 decreases. Similarly, if tip 122 moves over topographical feature 106, which is a bump, then the distance of cantilever structure 120 relative to gate 502 decreases. Therefore, the distance of FGT 110 relative to gate 502 decreases. Further, as a result of decrease in the distance, the electric field between FGT 110 and gate 502 increases.

The variation in electric field is detected using channel 112 of FGT 110. The variation in the electric field modifies the flow of current in FGT 110. A second voltage bias is applied between source 114 and drain 116 to modify the flow of current in FGT 110. The modification in the flow of current is represented as data by using circuitry and electrical connection (not shown in the FIG. 5) fabricated in supporting structure 118. This has been explained in conjunction with FIG. 1.

Figure 6:
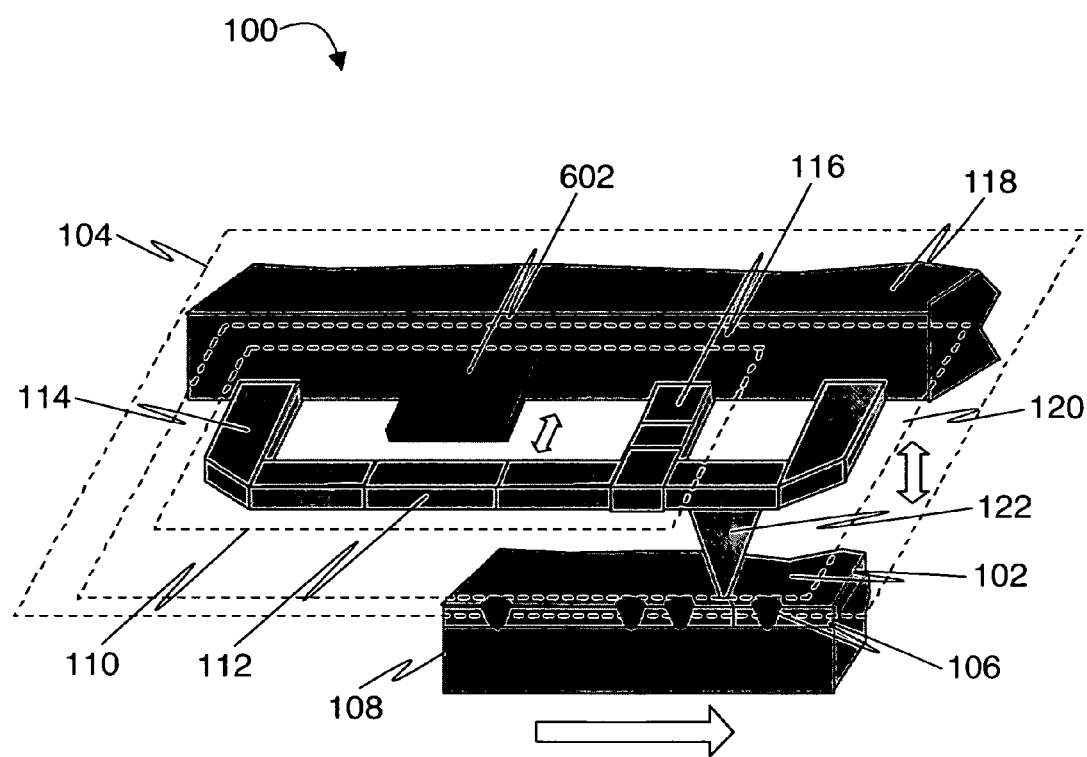
FIG. 6 shows a data storage system, in accordance with another exemplary embodiment of the invention.

FIG. 6 shows data storage system 100, in accordance with another exemplary embodiment of the invention. In this exemplary embodiment, FGT 110 is integrated in cantilever structure 120 of data storage system 100. It will be obvious to a person skilled in the art that more than one FGT can be integrated in cantilever structure 120. Further, a gate 602 is integrated in supporting structure 118. It will be obvious to a person skilled in the art that more than one gate can be integrated in supporting structure 118. A first voltage bias is applied to gate 602. The first voltage bias creates an electric field between gate 602 and FGT 110. Further, gate 602 is integrated in supporting structure 118, such that, FGT 110 moves in a direction perpendicular to the electric field created between gate 602 and FGT 110.

Further, FGT 110 moves if tip 122 moves into or over topographical feature 106, while reading data from storage medium 102. Data is read by moving substrate 108 relative to read head 104. While moving substrate 108 relative to read head 104, as tip 122 moves into or over topographical feature 106, the distance of cantilever structure 120 relative to gate 602 changes. Therefore, the distance of FGT 110 relative to gate 602 gets changed. Further, as a result of the change in the distance, the electric field between FGT 110 and gate 602 varies. In an embodiment of the invention, gate 602 is aligned with FGT 110, such that, the distance of gate 602 and FGT 110 relative to storage medium 102 is the same. In this case, if tip 122 moves into or over topographical feature 106, which is an indentation or a bump, then the distance of cantilever structure 120 relative to gate 602 increases. Therefore, the distance of FGT 110 relative to gate 602 increases. Further, as a result of increase in the distance, the electric field between FGT 110 and gate 602 decreases. In another embodiment of the invention, gate 602 has an offset with FGT 110. For example, the distance of gate 602 relative to storage medium 102 is greater than the distance of FGT 110 relative to storage medium 102. In this case, if tip 122 moves into topographical feature 106, which is an indentation, then the distance of cantilever structure 120 relative to gate 602 increases. Therefore, the distance of FGT 110 with respect to gate 602 increases. Further, as a result of increase in the distance, the electric field between FGT 110 and gate 602 decreases. Similarly, if tip 122 moves over topographical feature 106, which is a bump, then the distance of cantilever structure 120 relative to gate 602 decreases. Therefore, the distance of FGT 110 relative to gate 602 decreases. As a result of decrease in the distance, the electric field between FGT 110 and gate 602 increases.

Similarly, for example, the distance of gate 602 relative to storage medium 102 is less than the distance of FGT 110 relative to storage medium 102. In this case, if tip 122 moves into topographical feature 106, which is an indentation, then the distance of cantilever structure 120 relative to gate 602 decreases. Additionally, if tip 122 moves over topographical feature 106, which is a bump, then the distance of cantilever structure 120 relative to gate 602 increases.

The variation in electric field is detected using channel 112 of FGT 110. The variation in the electric field modifies the flow of current in FGT 110. A second voltage bias is applied between source 114 and drain 116 to modify the flow of current in FGT 110. The modification in the flow of current is represented as data by using circuitry and electrical connection (not shown in the FIG. 6) fabricated in supporting structure 118. This has been explained in conjunction with FIG. 1.

Figure 7:
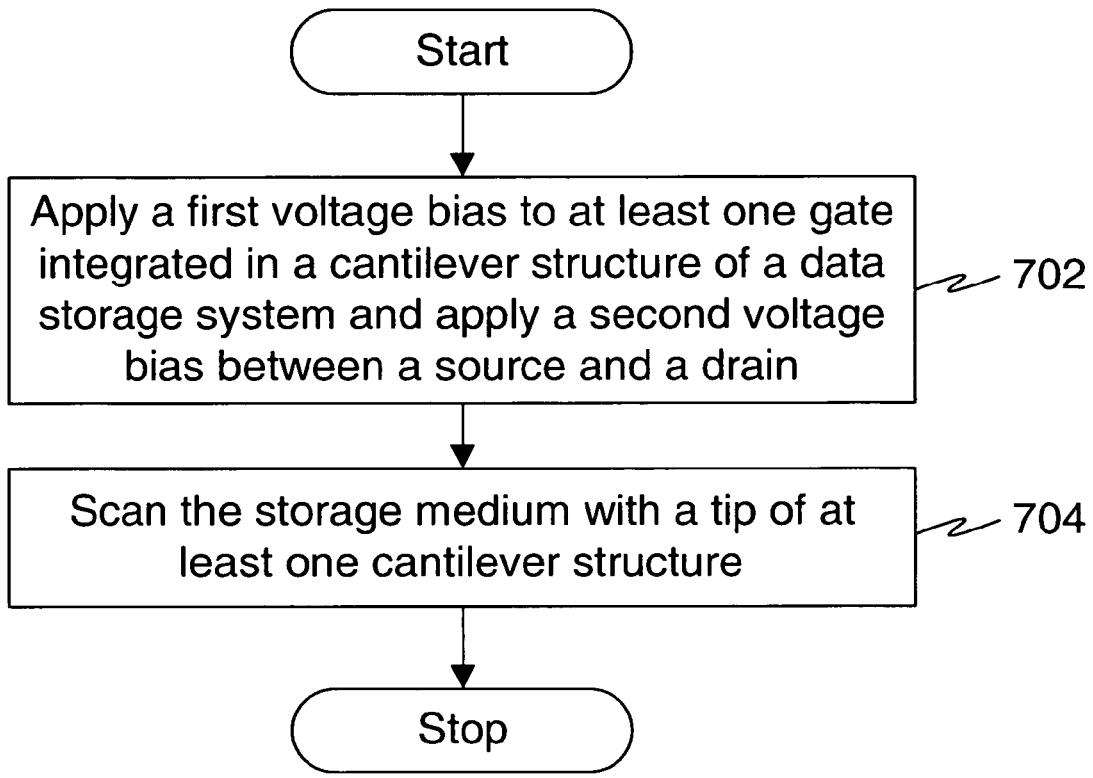
FIG. 7 is a flowchart of a method for reading data from a storage medium in a data storage system, in accordance with another embodiment of the invention.

FIG. 7 is a flowchart of a method for reading data from storage medium 102 in data storage system 100, in accordance with another embodiment of the invention. At step 702, a first voltage bias is applied to one or more gates in data storage system 100. Further, a second voltage bias is applied between source 114 and drain 116 to modify the flow of current in one or more FGTs. The first voltage bias creates an electric field between one or more gates and one or more FGTs. One or more FGTs are integrated in supporting structure 118 of data storage system 100. For example, FGT 110 is integrated in supporting structure 118. This is explained in detail in conjunction with FIG. 8 and FIG. 9.

Thereafter, at step 704, storage medium 102 is scanned with tip 122 of one or more cantilever structures. Each cantilever structure integrates one or more gates. For example, cantilever structure 120 integrates a gate. Storage medium 102 is scanned by moving tip 122 of one or more cantilever structures relative to storage medium 102. Tip 122 co-operates with a plurality of topographical features on storage medium 102 to read data. Data is stored as the plurality of topographical features on storage medium 102. The second voltage bias is applied between source 114 and drain 116 to modify the flow of current in one or more FGTs.

While scanning the storage medium 102, as tip 122 moves into or over a topographical feature on storage medium 102, the electric field between one or more gates and one or more FGTs varies. This is further explained in detail in conjunction with FIG. 8 and FIG. 9.

Additionally, in an exemplary embodiment of the invention, if tip 122 moves into or over a topographical feature, then each gate moves in a direction parallel to the electric field. This is further explained in detail in conjunction with FIG. 8. In another exemplary embodiment of the invention, if tip 122 moves into or over a topographical feature, then each gate moves in a direction perpendicular to the electric field. This is further explained in detail in conjunction with FIG. 9.

Figure 8:
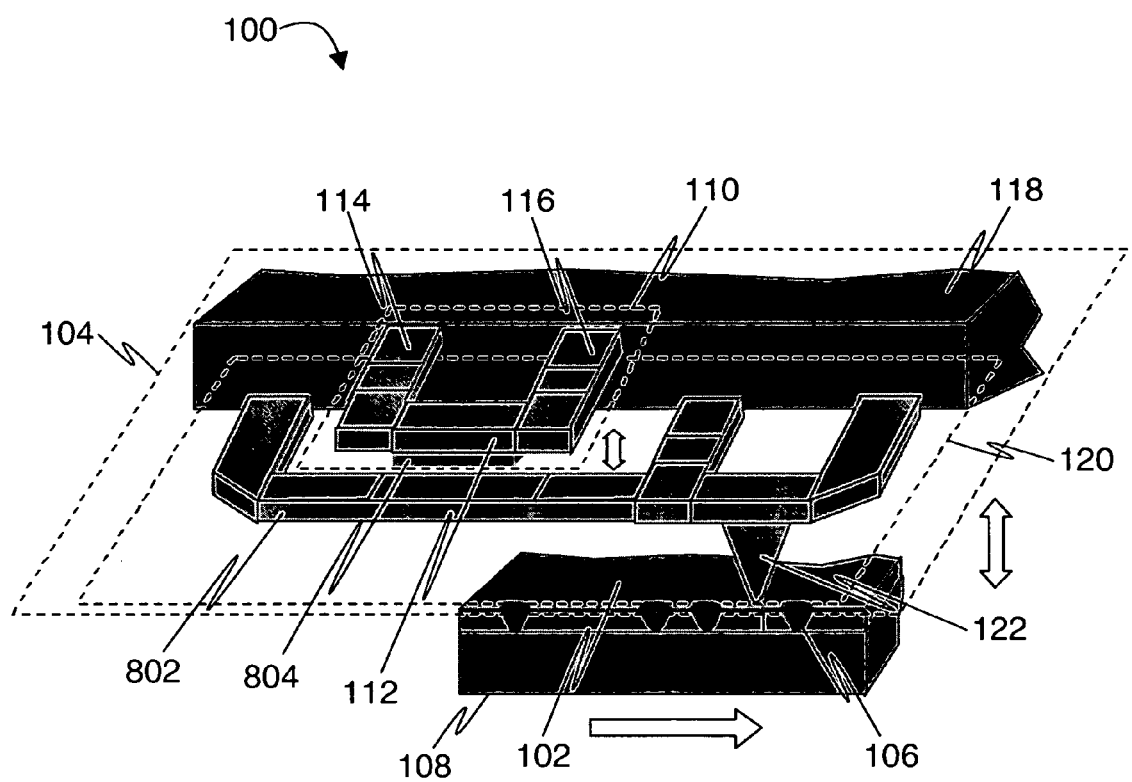
FIG. 8 shows a data storage system, in accordance with another exemplary embodiment of the invention.

FIG. 8 shows data storage system 100, in accordance with another exemplary embodiment of the invention. In this exemplary embodiment of the invention, FGT 110 is integrated in supporting structure 118. It will be obvious to a person skilled in the art that more than one FGT can be integrated in supporting structure 118. Further, a gate 802 is integrated in cantilever structure 120. It will be obvious to a person skilled in the art that more than one gate can be integrated in cantilever structure 120. A first voltage bias is applied to gate 802. The first voltage bias creates an electric field between gate 802 and FGT 110. Further, FGT 110 is integrated in supporting structure 118, such that, gate 802 moves in a direction parallel to the electric field created between gate 802 and FGT 110.

Further, gate 802 moves if tip 122 moves into or over topographical feature 106, while reading data from storage medium 102. Data is read by moving substrate 108 relative to read head 104. Further, while moving substrate 108 relative to read head 104, if tip 122 moves into or over topographical feature 106, the distance of cantilever structure 120 relative to FGT 110 changes. Therefore, the distance of gate 802 with respect to FGT 110 gets changed. Further, as a result of change in the distance, the electric field between FGT 110 and gate 802 varies. For example, if tip 122 moves into topographical feature 106, which is an indentation, then the distance of cantilever structure 120 relative to FGT 110 increases. Therefore, the distance of gate 802 relative to FGT 110 increases. Further, as a result of increase in the distance, the electric field between FGT 110 and gate 802 decreases. Similarly, if tip 122 moves over topographical feature 106, which is a bump, then the distance of cantilever structure 120 relative to FGT 110 decreases. Therefore, the distance of gate 802 relative to FGT 110 decreases. Further, as a result of decrease in the distance, the electric field between FGT 110 and gate 802 increases.

The variation in the electric field is detected using channel 112 of FGT 110. The variation in the electric field modifies the flow of current in FGT 110. A second voltage bias is applied between source 114 and drain 116 to modify the flow of current in FGT 110. The variation in the flow of current is represented as data by using circuitry and electrical connection fabricated (not shown in the FIG. 8) in supporting structure 118. Additionally, channel 112 has a gate-dielectric 804 attached to it. Gate-dielectric 804 is placed parallel to gate 802 between FGT 110 and gate 802.

Figure 9:
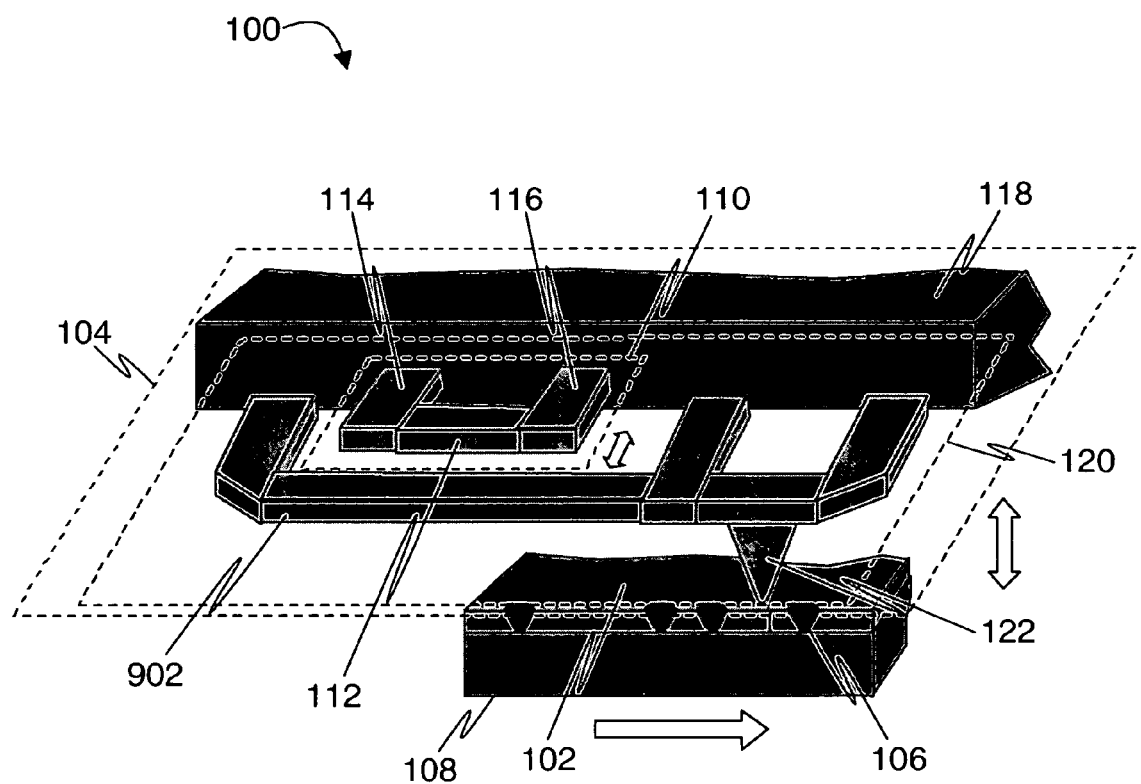
FIG. 9 shows a data storage system, in accordance with another exemplary embodiment of the invention.

FIG. 9 shows data storage system 100, in accordance with another exemplary embodiment of the invention. In this exemplary embodiment of the invention, FGT 110 is integrated in supporting structure 118. It will be obvious to a person skilled in the art that more than one FGT can be integrated in supporting structure 118. Further, a gate 902 is integrated in cantilever structure 120. It will be obvious to a person skilled in the art that more than one gate can be integrated in cantilever structure 120. A first voltage bias is applied to gate 902. The first voltage bias creates an electric field between gate 902 and FGT 110. Further, FGT 110 is integrated in supporting structure 118, such that, gate 902 moves in a direction perpendicular to the electric field created between gate 902 and FGT 110.

Further, gate 902 moves if tip 122 moves into or over topographical feature 106, while reading data from storage medium 102. Data is read by moving substrate 108 relative to read head 104. While moving substrate 108 relative to read head 104, if tip 122 moves into or over topographical feature 106, the distance of cantilever structure 120 relative to FGT 110 changes. Therefore, the distance of gate 902 with respect to FGT 110 gets changed. Further, as a result of the change in the distance, the electric field between FGT 110 and gate 902 varies. In an embodiment of the invention, FGT 110 is aligned with gate 902, such that, the distance of gate 902 and FGT 110 relative to storage medium 102 is same. In this case, if tip 122 moves into or over topographical feature 106, which is an indentation or a bump, then the distance of cantilever structure 120 relative to FGT 110 increases. Therefore, the distance of gate 902 with respect to FGT 110 increases. Further, as a result of increase in the distance, the electric field between FGT 110 and gate 902 decreases. In another embodiment of the invention, FGT 110 has an offset with gate 902. For example, the distance of FGT 110 relative to storage medium 102 is greater than the distance of gate 902 relative to storage medium 102. In this case, if tip 122 moves into topographical feature 106, which is an indentation, then the distance of cantilever structure 120 relative to FGT 110 increases. Therefore, the distance of FGT 110 with respect to gate 902 increases. Further, as a result of increase in the distance, the electric field between FGT 110 and gate 902 decreases. Similarly, if tip 122 moves over topographical feature 106, which is a bump, then the distance of cantilever structure 120 relative to FGT 110 decreases. Therefore, the distance of gate 902 relative to FGT 110 decreases. As a result of decrease in the distance, the electric field between FGT 110 and gate 902 increases.

Similarly, for example, the distance of FGT 110 relative to storage medium 102 is less than the distance of gate 902 relative to storage medium 102. In this case, if tip 122 moves into topographical feature 106, which is an indentation, then the distance of cantilever structure 120 relative to FGT 110 decreases. Additionally, if tip 122 moves over topographical feature 106, which is a bump, then the distance of cantilever structure 120 relative to FGT 110 increases.

The variation in the electric field is detected using channel 112 of FGT 110. The decrease in the electric field decreases the flow of current in FGT 110. A second voltage bias is applied between source 114 and drain 116 to modify the flow of current in FGT 110. The decrease in the flow of current is represented as data by using circuitry and electrical connection (not shown in the FIG. 9) inside supporting structure 118.

Various embodiments of the invention provide methods and systems to read data stored on a data storage system by applying a first voltage bias to a gate in the data storage system. Therefore, operating current and power can be much lower than in thermal sensing techniques. Additionally, the speed of data storage system is considerably larger and can be designed for operation speeds of tens to hundreds of MHz.

Further, various embodiments of the invention provide methods and systems in which large and weak thermal isolations is not required. Therefore, smaller and faster cantilever structures can be used. Additionally, the seek/access time in the data storage system decreases. Further, a large signal to carrier ratio can be achieved, as a result of which, design of detection electronics is simplified. The data storage system does not rely on air for transduction of displacement/distance information. Also, the data storage system is not sensitive to ambient pressure and is less sensitive to ambient temperature variations.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A data storage system comprising:
    a storage medium for storing data, wherein the storage medium has a first surface and stores data as a plurality of topographical features as at least one of indentations, bumps or trenches extending in at least one first direction upwardly or downwardly relative to the first surface;
    at least one transducer, wherein the at least one transducer writes data on the storage medium;
    at least one gate, wherein a first voltage bias is applied to the at least one gate; and
    at least one read head, wherein the at least one read head comprises:
    at least one supporting structure;
    at least one cantilever structure connected to and extending away from the supporting structure, the cantilever structure including a tip adapted to move in the at least one first direction at least one of upwardly or downwardly relative to the first surface into or over the plurality of topographical features when reading data stored on the storage medium; and
    at least one Floating Gate Transistor (FGT), wherein the first voltage bias creates an electric field between the at least one FGT and the at least one gate, a change in the electric field is detected by the at least one FGT, the FGT including a source, a drain and a channel,
    wherein the tip is displaced from each of the source, the drain, and the channel of the FGT in a direction along the first surface transverse to the at least one first direction.

2. The data storage system of claim 1, wherein the at least one FGT is integrated in each cantilever structure.

3. The data storage system of claim 1, wherein the storage medium is deposited on a substrate.

4. The data storage system of claim 3, wherein the substrate is the at least one gate.

5. A data storage system as claimed in claim 1, wherein the drain and the channel separate the source from the tip.

6. A method for reading data from a storage medium in a data storage system, the method comprising:
    applying a first voltage bias to at least one gate in the data storage system, wherein applying the first voltage bias creates an electric field between the at least one gate and at least one Floating Gate Transistor (FGT) having a source, a drain and a channel, the at least one gate is a substrate, wherein the storage medium is deposited on the substrate and has a first surface, wherein the storage medium has a plurality of topographical features including at least one of indentations, bumps or trenches extending in a first direction upwardly or downwardly relative to the first surface; and
    scanning the storage medium with a tip of at least one cantilever structure, the tip adapted to move in the first direction at least one of into or over the plurality of topographical features when reading the storage medium, wherein each cantilever structure integrates the at least one FGT, and the tip is displaced from each of the source, the drain, and the channel of the at least one FGT in at least one direction along the first surface transverse to the first direction, the storage medium being scanned by moving the tip of the at least one cantilever structure relative to the storage medium,
    wherein the tip co-operates with a plurality of topographical features on the storage medium to read the data stored on the storage medium, and data is stored as the plurality of topographical features.

7. The method of claim 6, wherein the electric field between the at least one gate and the at least one FGT varies if the tip moves into or over a topographical feature of the plurality of topographical features on the storage medium.

8. The method of claim 7, wherein a variation in the electric field between the at least one gate and the at least one FGT is detected by the at least one FGT, the variation of electric field modifies a flow of current in the at least one FGT, and a second voltage bias is applied to the source and the drain of the at least one FGT to modify the flow of current in the at least one FGT.

9. The method of claim 8, wherein a modification in the flow of current in the at least one FGT represents data.

10. A method as claimed in claim 6, wherein the drain and the channel separate the source from the tip.

* * * * *